United States Patent [19]

Takahashi et al.

[11] Patent Number: 5,654,756
[45] Date of Patent: Aug. 5, 1997

[54] IMAGE PICK-UP APPARATUS HAVING COLOR SPACE CONVERTER AND/OR SHIELD DISC WITH SLIT

[75] Inventors: Jynya Takahashi, Amagasaki; Masaki Yamakawa, Nagaokakyo; Akira Kanai, Amagasaki, all of Japan

[73] Assignee: Mitsubishi Denki Kabushiki Kaisha, Japan

[21] Appl. No.: 389,409

[22] Filed: Feb. 16, 1995

[30] Foreign Application Priority Data

Aug. 31, 1994 [JP] Japan .................... 6-207713

[51] Int. Cl.⁶ ............... H04N 9/07; H04N 9/083
[52] U.S. Cl. ............ 348/268; 348/269; 348/231; 348/270
[58] Field of Search ................... 348/222, 231, 348/266, 268, 269, 270, 272, 273, 280, 70, 370, 368, 367; 358/44; 345/150, 153; H04N 9/07, 9/083

[56] References Cited

U.S. PATENT DOCUMENTS

| | | | |
|---|---|---|---|
| 4,604,992 | 8/1986 | Sato | 348/67 |
| 4,622,584 | 11/1986 | Nagasaki | 348/69 |
| 4,875,091 | 10/1989 | Yamada | 348/269 |
| 5,408,268 | 4/1995 | Shipp | 348/269 |

OTHER PUBLICATIONS

F. Kerkhof and W. Werner, *Television*, First published 1952, pp. 376–383.

"NTSC System CBS System" *Television Art*, 1963 Apr., pp. 53–61.

*Primary Examiner*—Sherrie Hsia

[57] ABSTRACT

An image pick-up apparatus, wherein a light emitting device sequentially emits a plurality of colors of light to a subject, a mono-color image pick-up element photo-electrically converts light reflected by or transmitted through the subject into color-field sequential signals, a memory stores the color-field sequential signals separately in connection with respective colors, and a convertor sequentially or simultaneously reads out the color-field sequential signals stored in connection with the respective colors in the memory and converts them into desired video signals of various color spaces. A disc shaped light shield device with a slit intermittently interrupts light from the light emitting device.

18 Claims, 17 Drawing Sheets

1

IMAGE PICK-UP APPARATUS HAVING COLOR SPACE CONVERTER AND/OR SHIELD DISC WITH SLIT

BACKGROUND OF THE INVENTION

1. Field of the Invention

The present invention relates to an image pick-up apparatus and method which takes an image of a subject to generate color video signals of various color spaces.

2. Description of Related Art

FIG. 1 is a view showing a structure of a conventional image pick-up apparatus which uses three mono-color image pick-up elements for three primary colors. A reflected light reflected by a subject 41 is condensed by a lens 3 and is separated into three primary color lights of red (R), green (G) and blue (B) by a dichroic mirror 30. Each light is photoelectrically converted by a mono-color image pick-up element 4 into the primary color video signals R, G or B so as to be outputted. In general, the mono-color image pick-up element 4 is formed of a CCD or an pick-up tube.

In the conventional apparatus, the reflected light can be separated to obtain the video signals of three primary colors, and the color image of high resolution can be obtained from these video signals. However, a dichroic mirror of a high accuracy and three image pick-up elements are required, so that there are problems such that the apparatus has a large size, requires a complicated operation for adjustment and is expensive.

FIG. 2 is a view showing a structure of a conventional image pick-up apparatus using one image pick-up element. A reflected light reflected by the subject 41 is condensed by the lens 3, and is converted into chrominance signals Ye, Mg, Cy and G of four colors by a color image pick-up element 31. In general, the color image pick-up element 31 is provided at the front of the CCD with a color filter 33, in which filters of four colors, i.e., yellow (Ye), magenta (Mg), cyan blue (Cy) and green (G), which are additive complementary colors of red (R), green (G) and blue (B), are arranged in a mosaic form, in order to increase sensitivity, as shown in FIG. 3. The chrominance signals of four colors are converted into primary color video signals R, G and B by a converter 32.

Since the conventional apparatus thus constructed requires only one image pick-up element, sizes and cost can be reduced. However, its resolution is inferior to that of the conventional apparatus shown in FIG. 1, and its color reproducibility is also inferior to the same because the color image pick-up element 31 uses complementary colors.

FIG. 4 is a view showing a structure of a conventional image pick-up apparatus using a coloring device and one mono-color image pick-up element. A reflected light reflected by the subject 41 passes through a coloring device 35 provided with a color filter 36, e.g., of a disk-like form and an electric motor 37 for rotating the color filter 36. The color filter 36 has three regions of red (R), green (G) and blue (B), and can successively provide red light, green light and blue light in accordance with the rotation. These lights are condensed by the lens 3, and are converted by the mono-color image pick-up element 4 into color-field sequential primary color video signals, which are then converted by a converter 34 into the primary color video signals R, G and B.

In the conventional apparatus thus constructed, only one image pick-up element is required, and the resolution and color reproducibility are not inferior. However, it is difficult to reduce the size of the apparatus due to the structure of the coloring device 35 described above.

Since the conventional image pick-up apparatus which takes an image from the reflected light has the above structure, a large and expensive structure is required in order to obtain the image of high resolution, or reduction of the resolution cannot be avoided when the size and cost are to be reduced.

FIG. 5 is a view showing a structure of a conventional image pick-up apparatus using a plurality of color lights and one mono-color image pick-up element. This conventional apparatus uses a primary color light source 1 which sequentially emits three color lights of, e.g., red (R), green (G) and blue (B) to the subject 41. The reflected lights are condensed by the lens 3 to take the image by one mono-color image pick-up element 4. A color-field sequential primary color video signal M obtained in this manner is converted by a converter 42 into primary color video signals R, G and B. A light emitting timing of the primary color light source 1 is controlled by a light emission control device 43.

In the conventional apparatus thus constructed, only one image pick-up element is required, the resolution and color reproducibility are not impaired and reduction of the size is allowed. However, it has such a disadvantage that it is impossible to output signals for the color image display in the color-field sequential type in spite of the fact that the converter 42 is required.

Such an image pick-up apparatus is now available that uses a color CCD and takes an image from a light having passed through a subject such as a color slide or color film. In this conventional image pick-up apparatus, the picture is coarse because the apparatus uses the color CCD. It requires an additional converter for connecting thereto a color display of a color-field sequential type having small size and allowing display of a highly fine picture, which not preferable in view of reduction of the size of the apparatus and the cost.

SUMMARY OF THE INVENTION

The present invention has been developed to overcome the above problems, and it is a main object of the invention to provide an image pick-up apparatus allowing reduction of the size and cost as well as increase of resolution owing to the structure wherein one mono-color image pick-up element outputs a color-field sequential signal including sequentially sent video signals of colors corresponding to a plurality of color lights, and a converting means outputs desired signals such as signals for a color display of a color-field sequential type by a simple signal-process.

An image pick-up apparatus according to the invention comprises an image pick-up element of a mono-color for photoelectrically converting reflected light or transmitted light into color-field sequential signals, memory means for storing the color-field sequential signals separately in connection with respective colors, and converting means for simultaneously reading the color-field sequential signals stored in connection with the respective colors and converting them into video signals. The image pick-up element of the mono-color sequentially supplies video signals of the respective colors corresponding to a plurality of color lights to the converting means. The color-field sequential signals are converted by the converting means into video signals such as color-field sequential signals of a multiplied speed handling, for example, the former color-field sequential signals for a plurality of pictures as the signals for one picture, primary chrominance signals, luminance signals, color-difference signals, carrier chrominance signals or composite video signals. Accordingly, since the color-field sequential signals can be converted into various kinds of desired video signals, when appropriate signals among them are sent to a display side, they can correspond to various kinds of displays such as a color display of a color-field sequential type.

The light emitting means sequentially emits a plurality of color lights in a predetermined frequency, or continuously emits the plurality of color lights. When the plurality of color lights are sequentially emitted in the predetermined frequency, there is provided control means for controlling by making a memory period of the memory means and a light emission period of the light emitting means correspond to each other. The control means sequentially converts the plurality of color lights in, for example, a period of two fields of a vertical synchronizing signal used in the image pick-up element, and each turn-on period corresponds to one field or less. When the control means stops storing of the memory means and carries out only reading, a static color image can be obtained. Also, this enables input of the static image at an arbitrary position while continuing input of the video signals. The control means may set the turn-on period of the light emitting means to one field or less of two fields, whereby the video signals without interference of the respective color lights can be obtained.

When a large number of light emission sources for the plurality of color lights are so configured as to be arranged uniformly around the image pick-up element, sufficient light can be radiated from uniform positions, so that conditions suitable for close-up image pick-up can be obtained. Since the respective color lights are uniformly spaced from the subject, a uniform white balance can be obtained over the whole screen.

A color CRT may be used for emitting the plurality of color lights. Thereby, the respective color lights can be emitted from the same position. Also, coloring can be freely adjusted, so that the white balance can be easily adjusted. Further, the position of luminescence on the screen of the color CRT can be freely changed, so that the light can be radiated only to a portion of the subject. Thereby, one can select various radiating manners such as radiating only to a moving object within a range of a size of the screen and radiating to portions other than those having a discoloration resistance in accordance with the color of light.

Meanwhile, when the light emitting means continuously emits the plurality of color lights, shield means is arranged between the light emitting means and the subject, the shield means including a rotary shielding plate, for example, provided with a slit and rotation control means for controlling rotation of the rotary shielding plate in synchronization with the light emission of the light emitting means. Accordingly, it is not necessary to perform intermittent power-on of the light source of the light emitting means, so that one can use the light source having a low on/off response. Further, it is possible to prevent reduction of a life-time of the light source caused by highly frequent on/off switching.

The light emitted from the light emitting means may be radiated indirectly to the subject by indirect radiating means. Although luminosities are different from each other at positions of different distances from the emitting position of the light source, indirect light may be used to attain the uniform luminosity over the entire screen. Moreover, it is possible to prevent difference in color at different positions on the screen caused by difference in positions of the light sources, so that uniform white balance can be obtained over the entire screen.

The light emitting means may include a white light source and a coloring device. In this case, the respective colors can be radiated to the subject from the substantially same position, so that uniform white balance can be obtained over the entire screen. Control may be performed in such a manner that on/off of the white light source is performed or the light sources have different intensities of luminosity, whereby the white balance can be adjusted.

The plurality of color lights described above may be lights of the three primary colors of red, green and blue, whereby the color reproducibility can be higher than that in case of using of complementary colors for the three primary colors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the invention will be described below with reference to the drawings.

Embodiment 1

Figure 6:
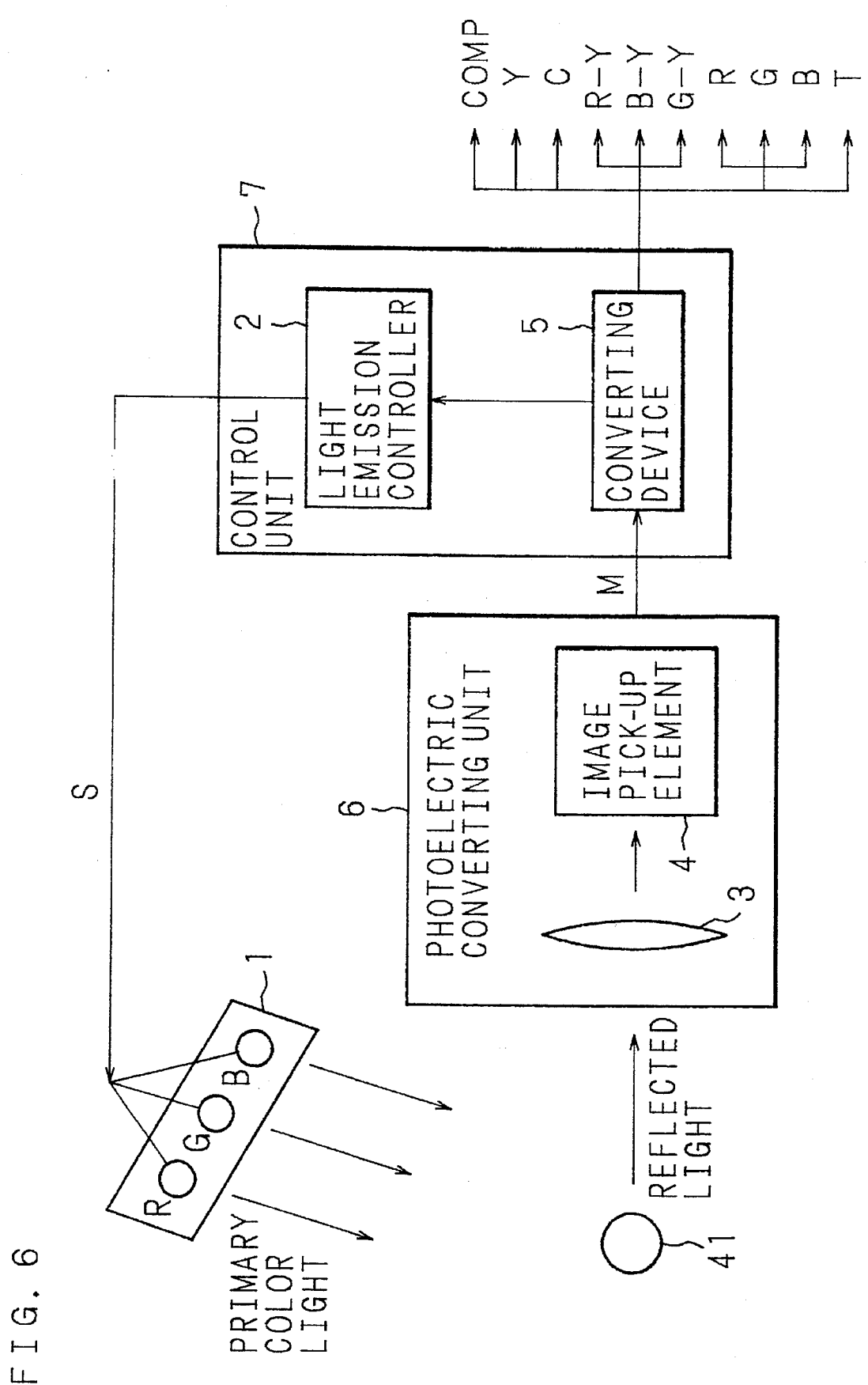
FIG. 6 is a view showing a structure of an embodiment 1 of an image pick-up apparatus according to the invention.

FIG. 6 is a view showing a structure of an embodiment 1 of an image pick-up apparatus according to the invention. This apparatus includes a primary color light source 1 for sequentially emitting lights (R, G and B) of three primary colors, a photoelectric converting unit 6 which condenses the light reflected by a subject 41 with a lens 3 and photoelectrically converts the light with a mono-color image pick-up element 4, and a control unit 7. The control unit 7 includes a converting device 5 which converts the photoelectrically converted color-field sequential primary chrominance signals M into predetermined video signals and a light emission controller 2 which supplies a control signal S to be used to control emission to the primary color light source 1.

Figure 7:
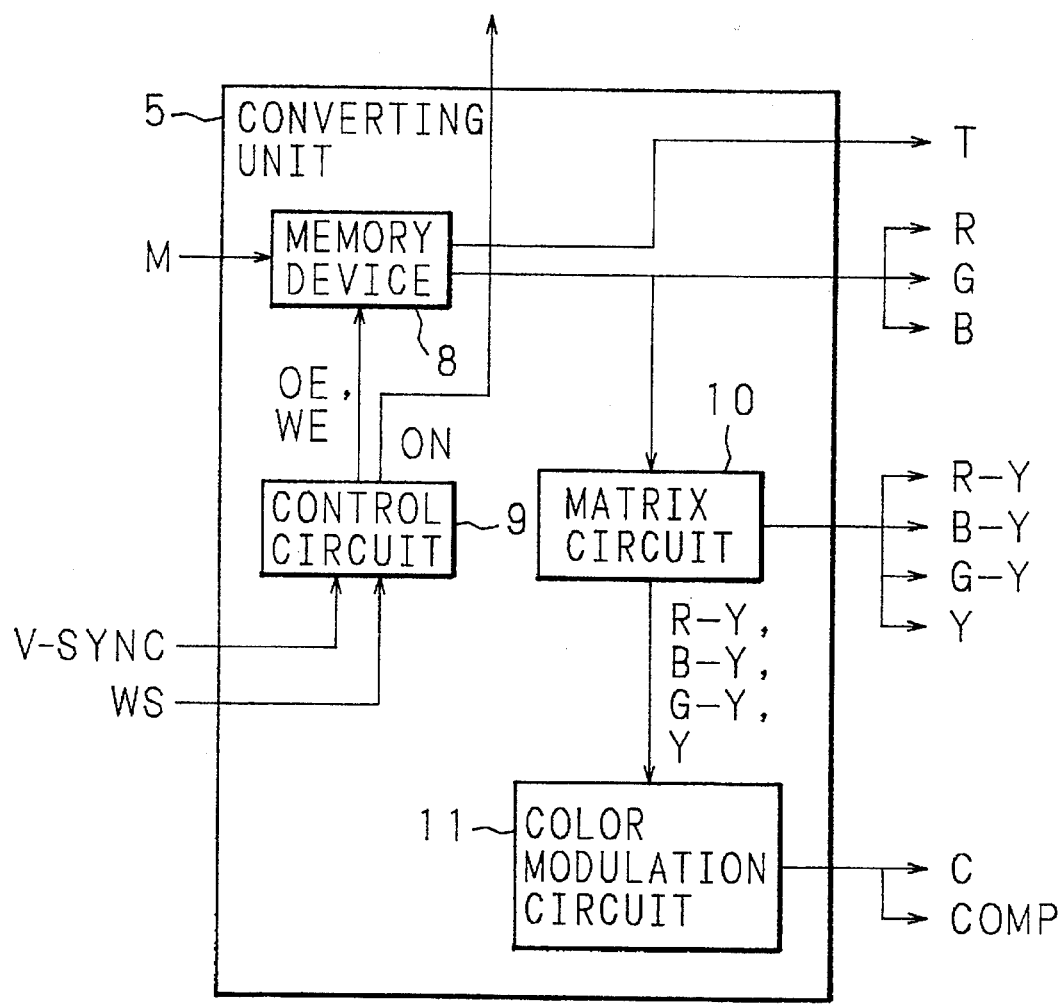
FIG. 7 is a circuit block diagram of a converting device shown in FIG. 6.

FIG. 7 shows a circuit block diagram of the converting device 5. The converting device 5 includes a memory device 8 for storing the color-field sequential primary chrominance signals M, a control circuit 9 for controlling writing in the memory device 8, a matrix circuit 10 for converting the primary color video signals R, G and B among signals including a color-field sequential primary chrominance signal of a triple speed T supplied from the memory device 8 and the primary color video signals R, G and B, into a luminance signal Y and color-difference signals R-Y, B-Y and G-Y, and a color modulation circuit 11 for performing color modulation on the basis of a luminance signal Y and the color-difference signals R-Y, B-Y and G-Y to produce a carrier chrominance signal C and a composite video signal COMP.

An operation of the apparatus of the invention thus constructed will be described below.

The primary color lights (R, G and B) sequentially emitted from the primary color light source 1 are reflected by the subject 41. The reflected lights are condensed by the lens 3 and are photoelectrically converted by the mono-color image pick-up element 4 and outputted as the color-field sequential primary chrominance signals M. The color-field sequential primary chrominance signals M are signals corresponding to radiation of the primary color lights (R, G and B).

The color-field sequential primary chrominance signals M are supplied to the converting device 5 of the control unit 7. The converting device 5 stores the color-field sequential primary chrominance signals M separately in connection with the respective primary video signals R, G and B in the memory device 8. The color-field sequential primary chrominance signals of triple speed T can be obtained by sequentially reading the respective primary video signals R, G and B in the triple speed and forming the signals for one image from those for three images. Alternatively, another video signals can be obtained by the simultaneous reading.

Figure 8:
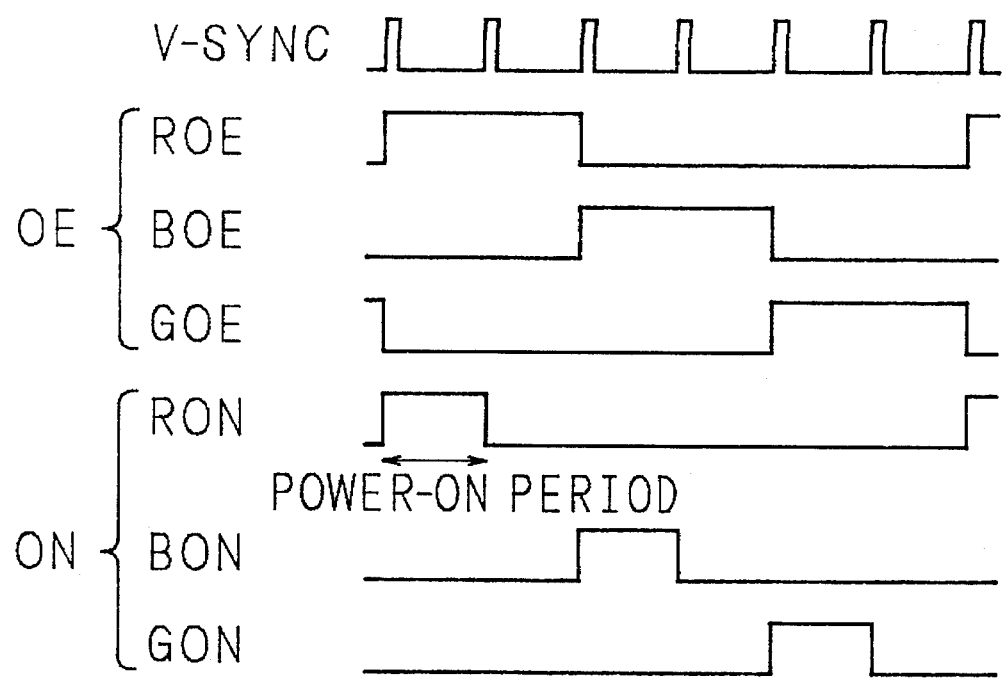
FIG. 8 is a timing chart showing various control signals in the embodiment 1.

FIG. 8 is a timing chart showing various control signals in the apparatus of the invention. A control circuit 9 in the converting device 5 is supplied with a vertical synchronous signal V-SYNC from the image pick-up element 4, and is also supplied with a write stop signal WS from a predetermined device. The control circuit 9 produces a read-out signal OE, in which a red read-out signal ROE, a blue read-out signal BOE and a green read-out signal GOE are sequentially set to "H" during a period of two fields of the vertical synchronous signal V-SYNC, on the basis of the vertical synchronous signal V-SYNC, and supplies the signal OE to the memory device 8. The memory device 8 stores the color video signal only while the read signal of the corresponding color is "H". The control circuit 9 produces a write enable signal WE on the basis of the vertical synchronous signal V-SYNC and supplies it to the memory device 8.

Further, the control circuit 9 supplies to the light emission controller 2 a power-on signal ON including a red on-signal RON, a blue on-signal BON and a green on-signal GON which attain "H" during a period of an earlier half, i.e., one field, of the period of "H" of a red read-out signal ROE, a blue read-out signal BOE and a green read-out signal GOE, respectively. The light emission controller 2 sets the period of "H" to be not longer than one field of the vertical synchronous signal V-SYNC on the basis of the power-on signal ON, and supplies a light emission control signal S to the primary color light source 1. The primary color light source 1 emits the light only for the period of "H" of the power-on signal ON. By changing the power-on period of each light source, a ratio of three primary colors (R, G and B) can be changed. Here, the primary color light source I can be formed of an LED which is small in size and can attain a high response.

In case of obtaining a static color picture, the write stop signal WS is supplied to the control circuit 9 to limit the write period. By controlling the write period correspondingly to the fields, a stroboscopic operation can be performed.

The matrix circuit 10 operates in such a manner that, when the primary color video signals R, G and B are read on the basis of the read-out signal given from the control circuit 9, they are converted into the luminance signal Y and the color-difference signals R-Y, B-Y and G-Y so as to be outputted to the color modulation circuit 11 and an external unit. The color modulation circuit 11 produces the carrier chrominance signal C and the composite video signal COMP from the luminance signal Y and the color-difference signals R-Y, B-Y and G-Y so as to be outputted to the outside.

Figure 9:
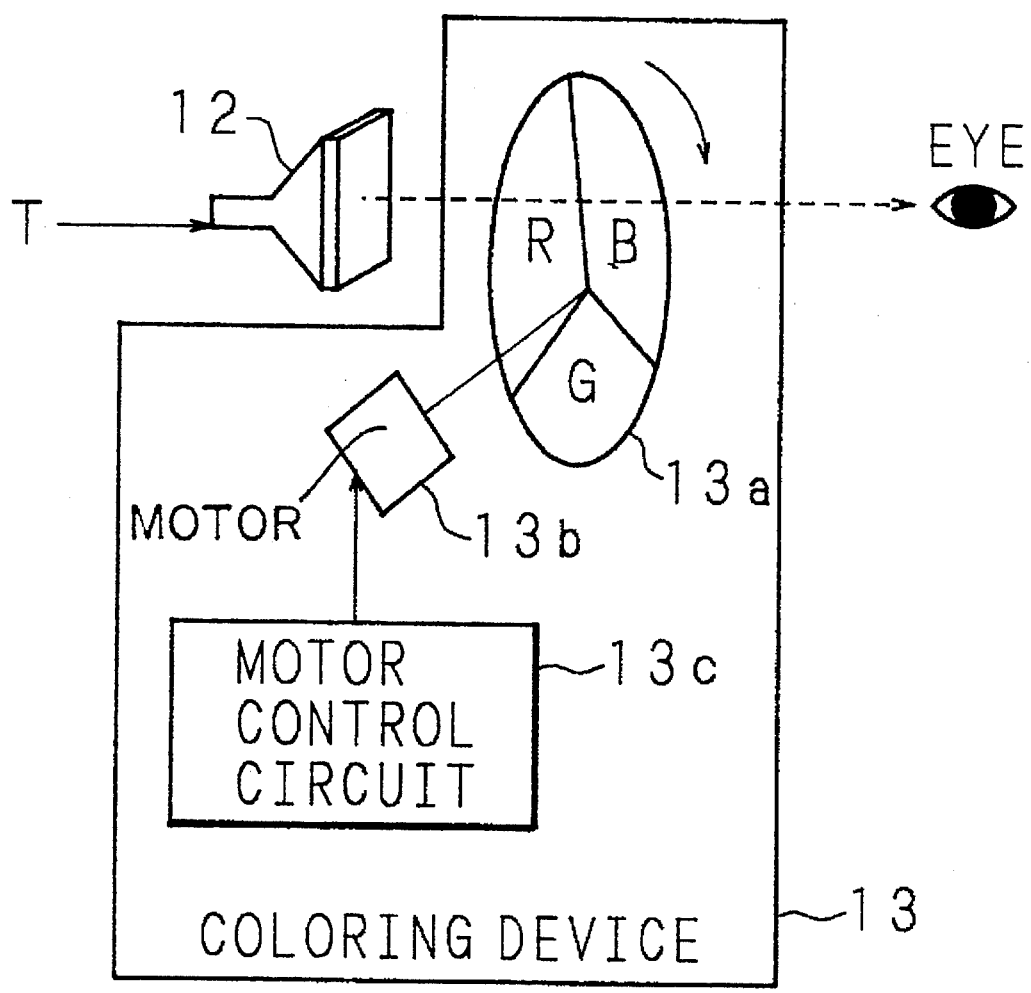
FIG. 9 is a view showing a structure of a color display receiving color-field sequential primary chrominance signals of triple speed.

When the primary color video signals R, G and B may be read out at triple speed from the memory device 8, the color-field sequential primary chrominance signals of triple speed T can be obtained. FIG. 9 is a view showing a structure of a color display of color-field sequential type receiving the color-field sequential primary chrominance signal of triple speed T. In this example, the color-field sequential primary chrominance signal of triple speed T is received by the mono-color CRT 12 to produce a picture, and the picture is colored by the coloring device 13 and sent to viewers. The coloring device 13 includes a color filter 13a of three primary colors (R, G and B), an electric motor 13b for rotating the color filter 13a, and a motor control circuit 13c for so controlling the rotation of the motor 13b as to be synchronized with the color-field sequential primary chrominance signal T of triple speed. In this structure the picture of higher resolution can be obtained than that of the color CRT having the same size.

Figure 1:
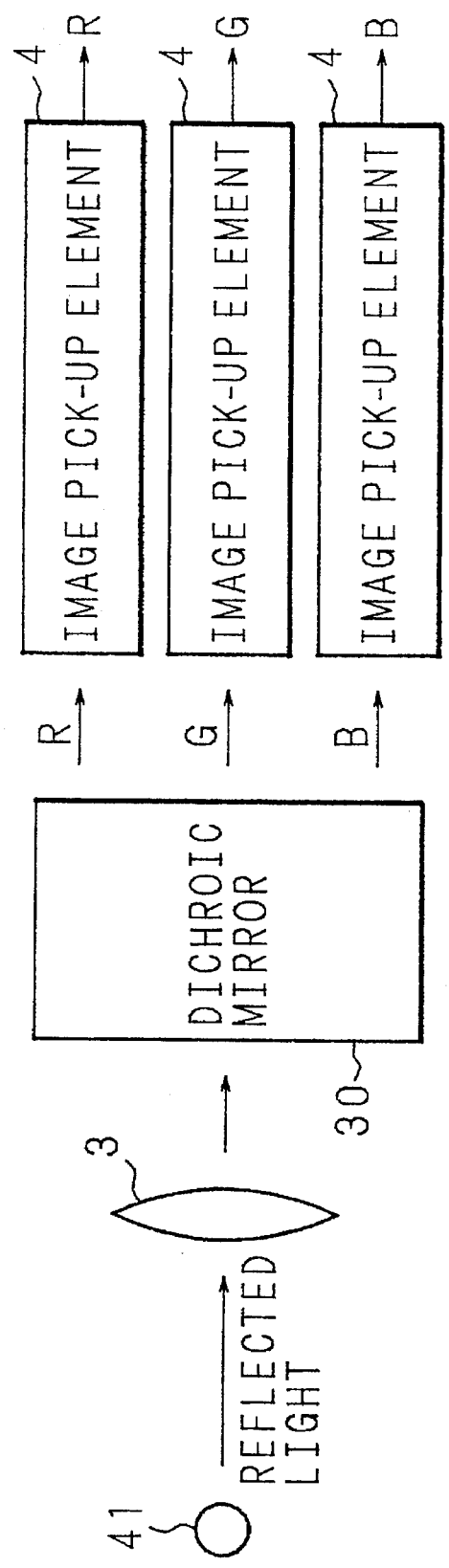
FIG. 1 is a view showing a structure of a conventional image pick-up apparatus using three mono-color image pick-up elements for three primary colors.

Since each resolution of the primary color video signals R, G and B is equal to the resolution of the monocolor image pick-up element 4, the video signal can have a high resolution similar to that of the prior art shown in FIG. 1.

Figure 2:
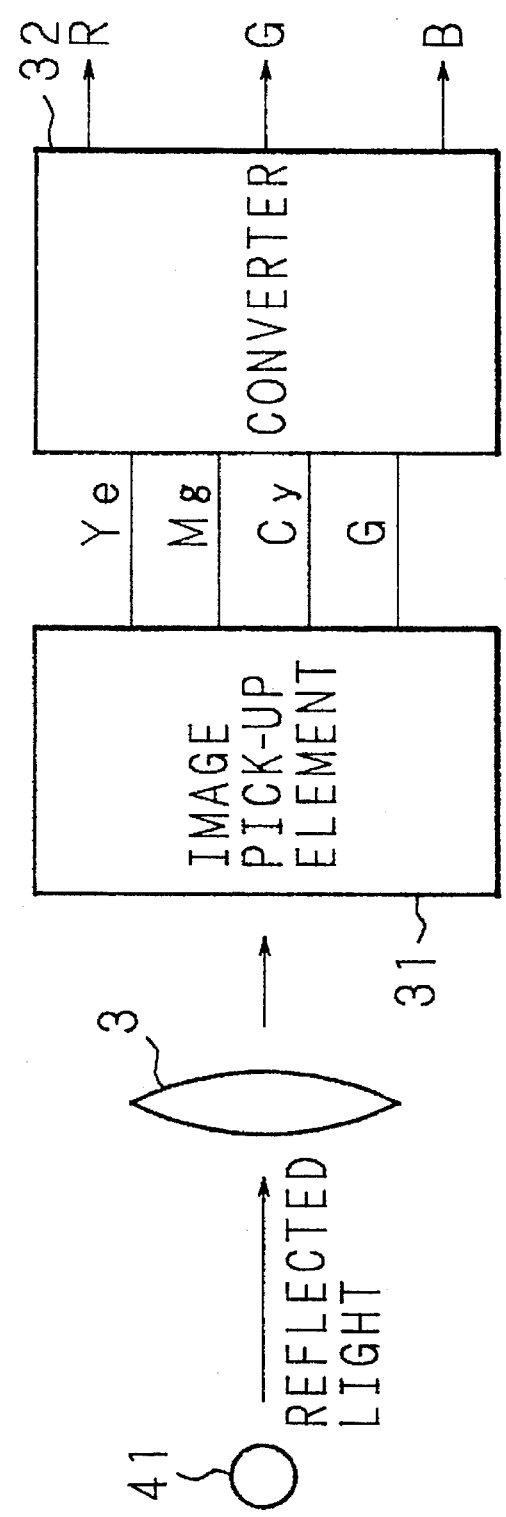
FIG. 2 is a view showing a structure of a conventional image pick-up apparatus using one image pick-up element.
Figure 3:
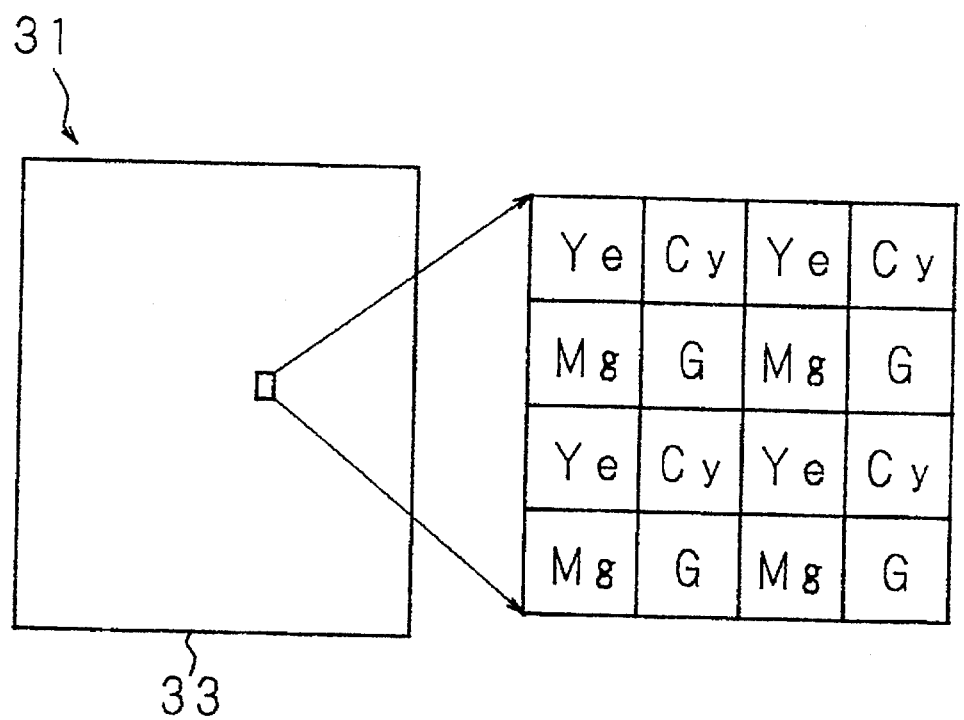
FIG. 3 is an elevation of the image pick-up element shown in FIG. 2.
Figure 4:
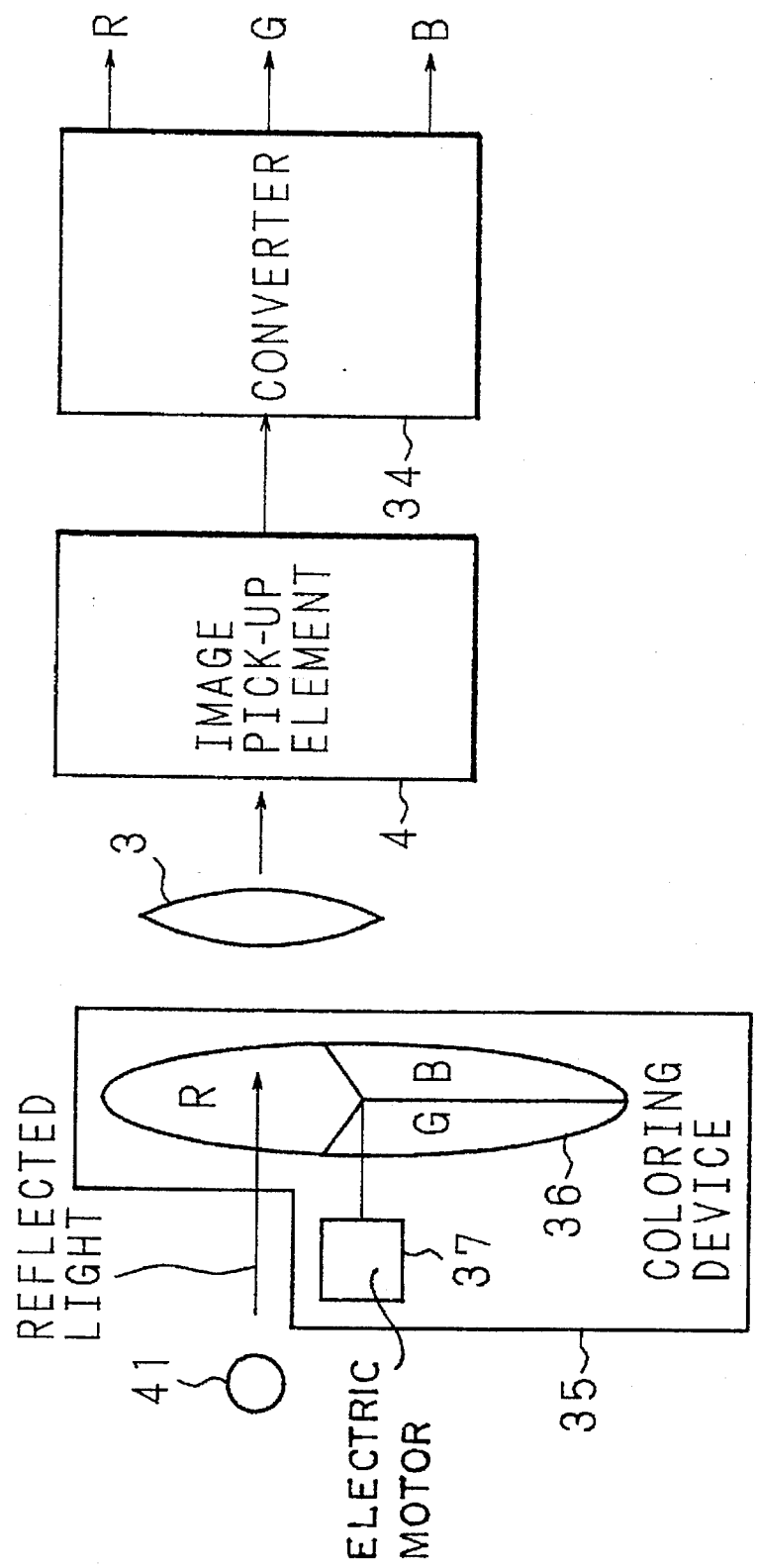
FIG. 4 is a view showing a structure of a conventional image pick-up apparatus using a coloring device and one mono-color image pick-up element.
Figure 5:
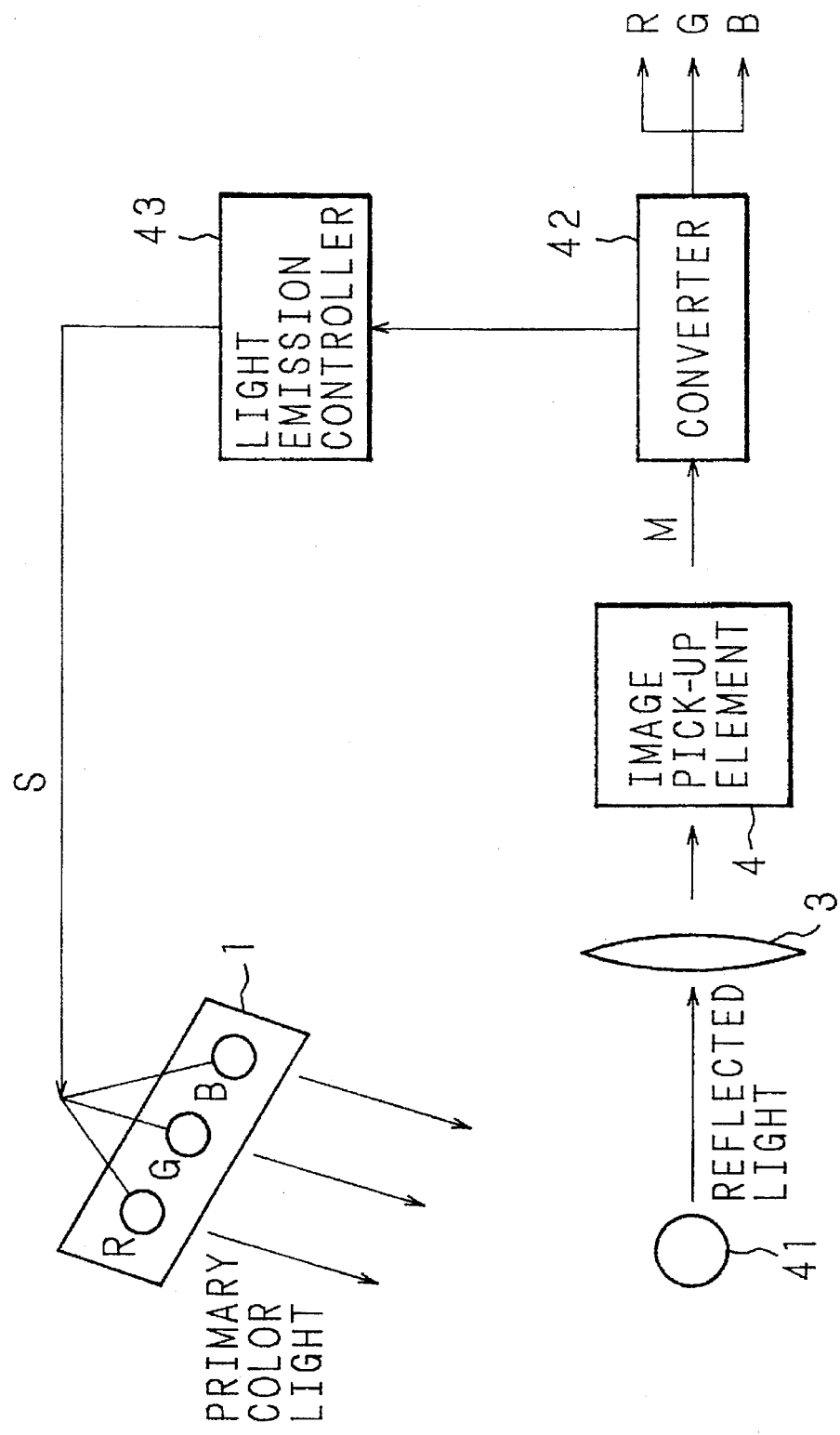
FIG. 5 is a view showing a structure of a conventional image pick-up apparatus using a plurality of color lights and one mono-color image pick-up element.

Although the embodiment uses the light source for the three primary colors, i.e., red (R), green (G) and blue (B), another primary chrominance signals for cyan blue, magenta, yellow or the like can be employed. Further, the light source of four colors including white light in addition to the three primary color lights can be used. The embodiment can provide the picture of which pixels are approximately triple the number of those in the prior art shown in FIG. 2, and requires only one mono-color image pick-up element, so that the apparatus can be inexpensive.

Embodiment 2

Figure 10:
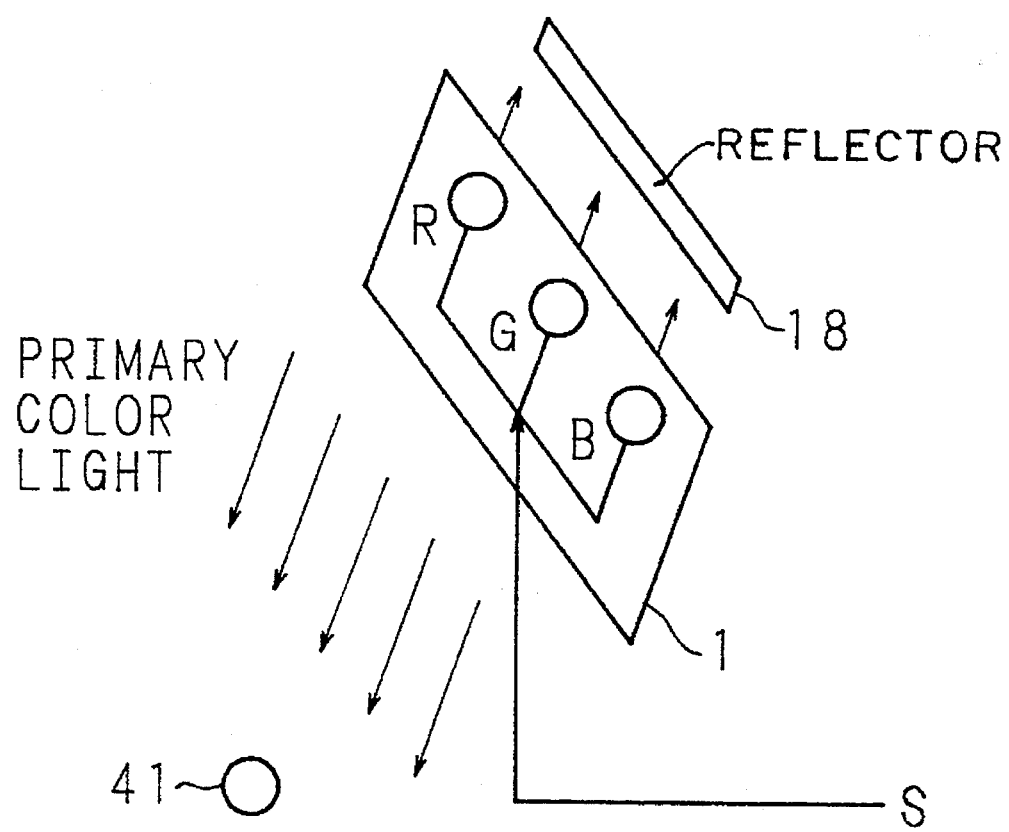
FIG. 10 a view showing a structure of a modified example of the embodiment 1.

FIG. 10 is a view showing a structure of a modified example of the embodiment 1, and specifically shows only a portion for radiating the light to the subject 41. In this embodiment, the light which is emitted by the primary color light source 1 on the basis of the light emission control signal S is reflected by a reflector 18 so as to be radiated indirectly to the subject 41.

According to the direct radiation shown in embodiment 1, it is difficult to attain the uniform white balance, because, for example, the right side of the screen becomes slightly red. Meanwhile, in the embodiment 2, since the light is reflected by the reflector 18, the uniform white balance can be obtained over the whole screen. Similar to the embodiment 1, the second embodiment can provide the video signal with a high resolution.

Embodiment 3

Figure 11:
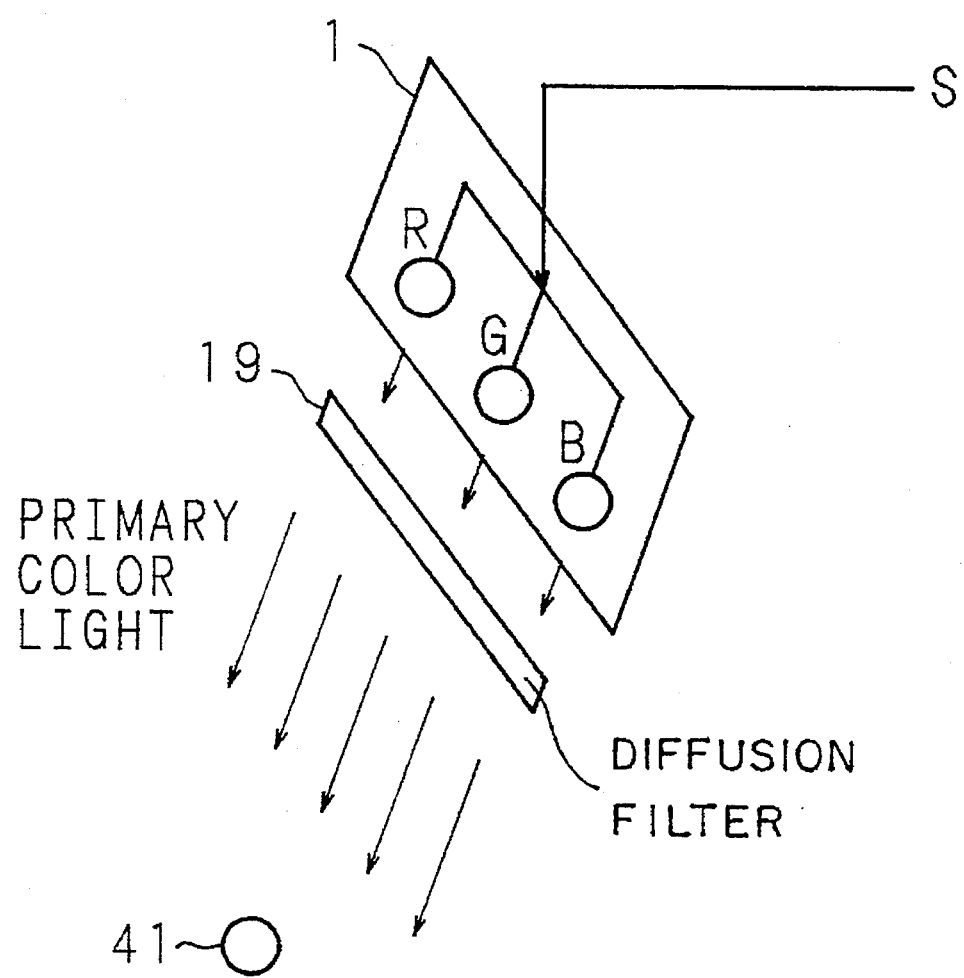
FIG. 11 is a view showing a structure of another modified example of the embodiment 1.

FIG. 11 is a view showing a structure of another modified example of the embodiment 1, and specifically shows only a portion for radiating the light to the substrate 41. In this embodiment, the light which is emitted by the primary color light source 1 on the basis of the light emission control signal S is diffused by a diffusion filter 19 so as to be radiated to the subject 41.

This embodiment can provide the effects similar to those provided by the embodiment 2.

Embodiment 4

Figure 12:
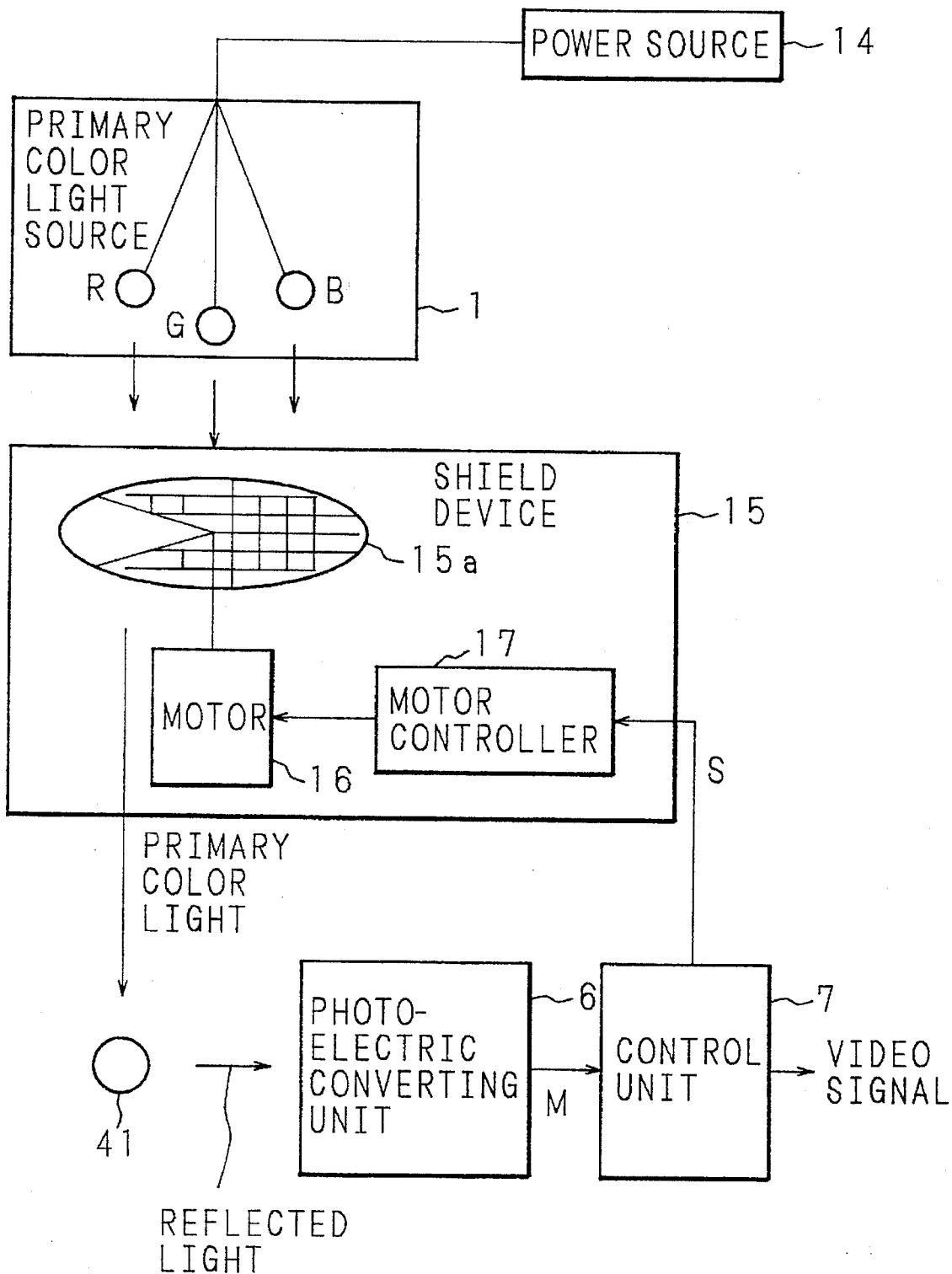
FIG. 12 is a view showing a structure of an embodiment 4 of an image pick-up apparatus according to the invention.

FIG. 12 is a view showing a structure of embodiment 4 of the image pick-up apparatus according to the invention. In this embodiment, the primary color light source 1 is connected to a power source 14 and is continuously powered on. The primary color light is radiated to the subject 41 through a shield device 15 to which the light emission control signal S is inputted from the control unit 7. The shield device 15 includes a shield disk 15a provided with a slit, an electric motor 16 for rotating the shield disk 15a, and a motor controller 17 for controlling drive of the motor 16 on the basis of the emission control signal S. The photoelectric converting unit 6 and the control unit 7 have the same structures as those shown in FIG. 6.

In this embodiment, it is not necessary to intermittently power on the primary color light source 1, and the embodiment can use a light source of which power-on response is low. Similar to the embodiment 1, the fourth embodiment can provide the video signal with a high resolution.

Embodiment 5

Figure 13:
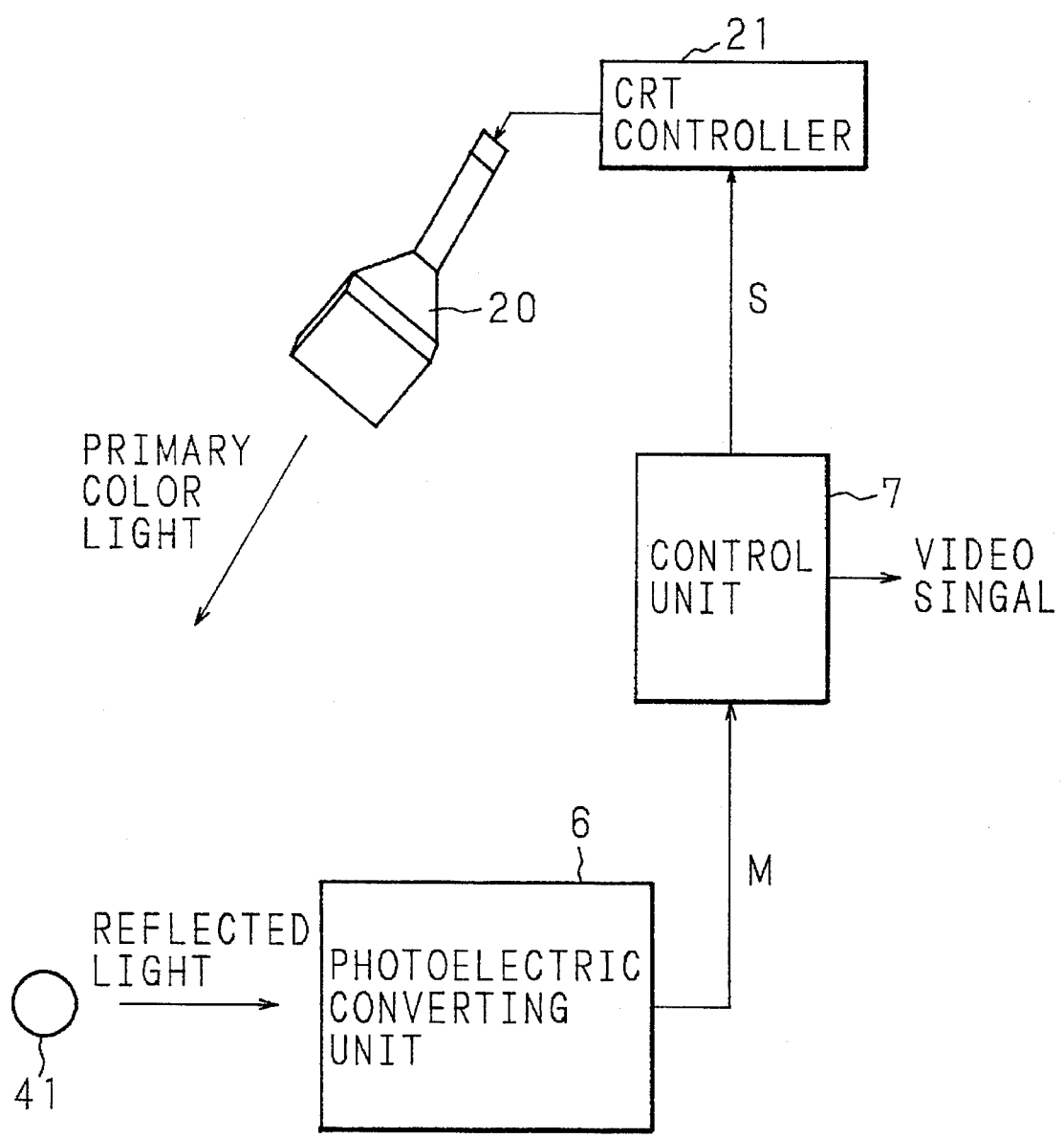
FIG. 13 is a view showing a structure of an embodiment 5 of an mag pick-up apparatus according to the invention.

FIG. 13 is a view showing a structure of an embodiment 5 of the image pick-up apparatus according to the invention. This embodiment uses a color CRT 20 instead of the primary color light source 1 shown in FIG. 6. The color CRT 20 sequentially emits the respective primary color lights under the control by a CRT controller 21 on the basis of the light emission control signal S. The photoelectric converting unit 6 and the control unit 7 have the same structures as those shown in FIG. 6.

In this embodiment, the respective primary color lights can be radiated to the subject 41 from the substantially same position. Thereby, the uniform white balance can be obtained over the whole screen. The emission characteristics of the respective primary color lights can be freely adjusted. Further, the position of luminescence on the screen of the color CRT 20 can be easily moved, so that the light source can be easily moved. Similar to the embodiment 1, the embodiment 5 can provide the video signal with a high resolution.

Embodiment 6

Figure 14:
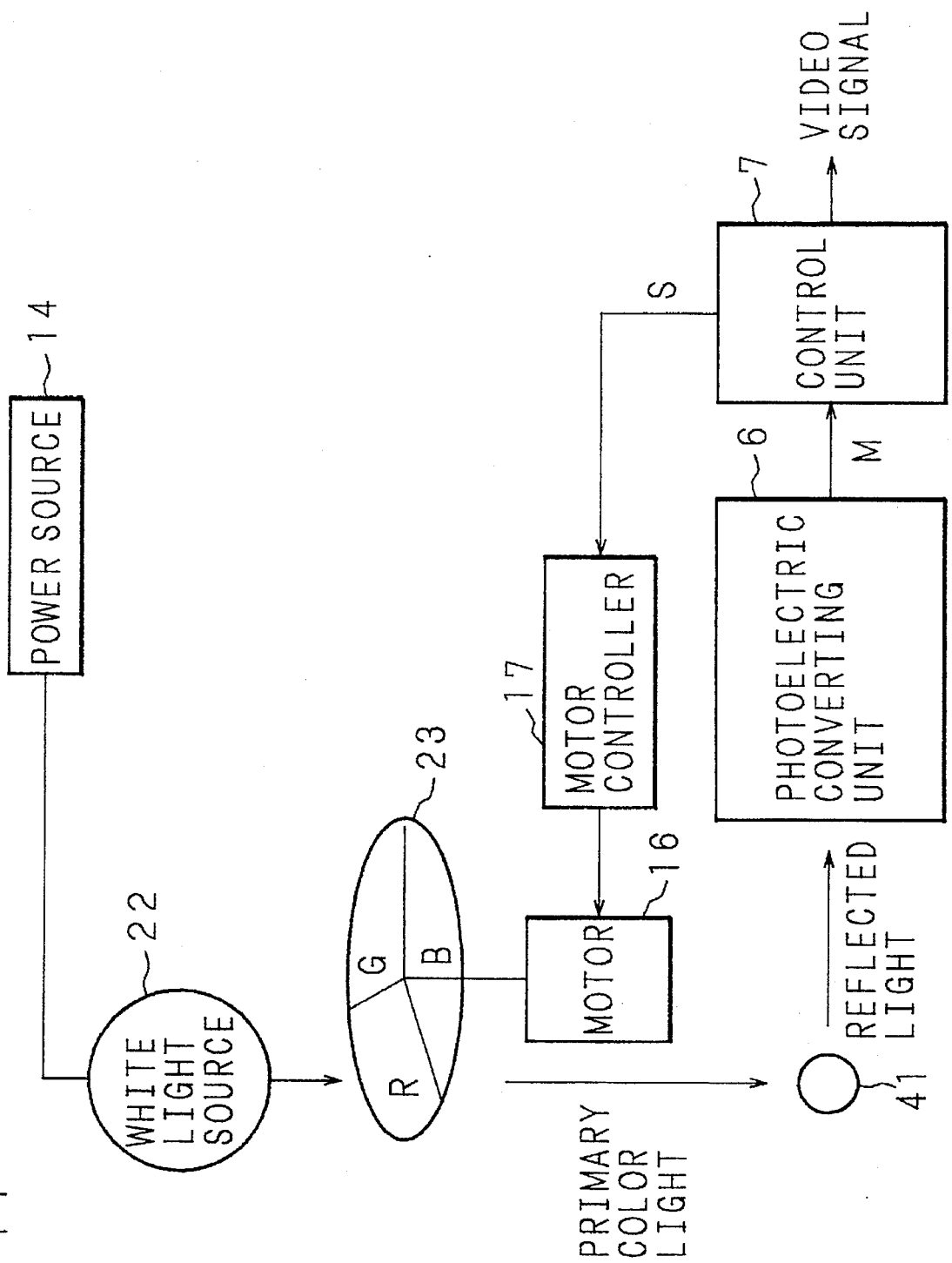
FIG. 14 is a view showing a structure of an embodiment 6 of an image pick-up apparatus according to the invention.

FIG. 14 is a view showing a structure of an embodiment 6 of the image pick-up apparatus according to the invention. This embodiment uses a white light source 22 connected to the power source 14 instead of the primary color light source 1 shown in FIG. 6. The light emitted from the white light source 22 is colored by a rotary color filter 23 having three regions of red (R), green (G) and blue (B) before being radiated to the substrate 41. The rotary color filter 23 is driven by the electric motor 16, the motor 16 being controlled by the motor controller 17 on the basis of the light emission control signal S. The photoelectric converting unit 6 and the control unit 7 have the same structures as those shown in FIG. 6.

This embodiment can radiate the primary color lights from the same position, so that the uniform white balance can be obtained over the entire screen. Although intermittent power-on of the white light source 22 is not required, the intermittent power-on may be carried out for adjusting the white balance. Similarly to the embodiment 1, this embodiment can provide the video signal of high resolution.

Embodiment 7

Figure 15:
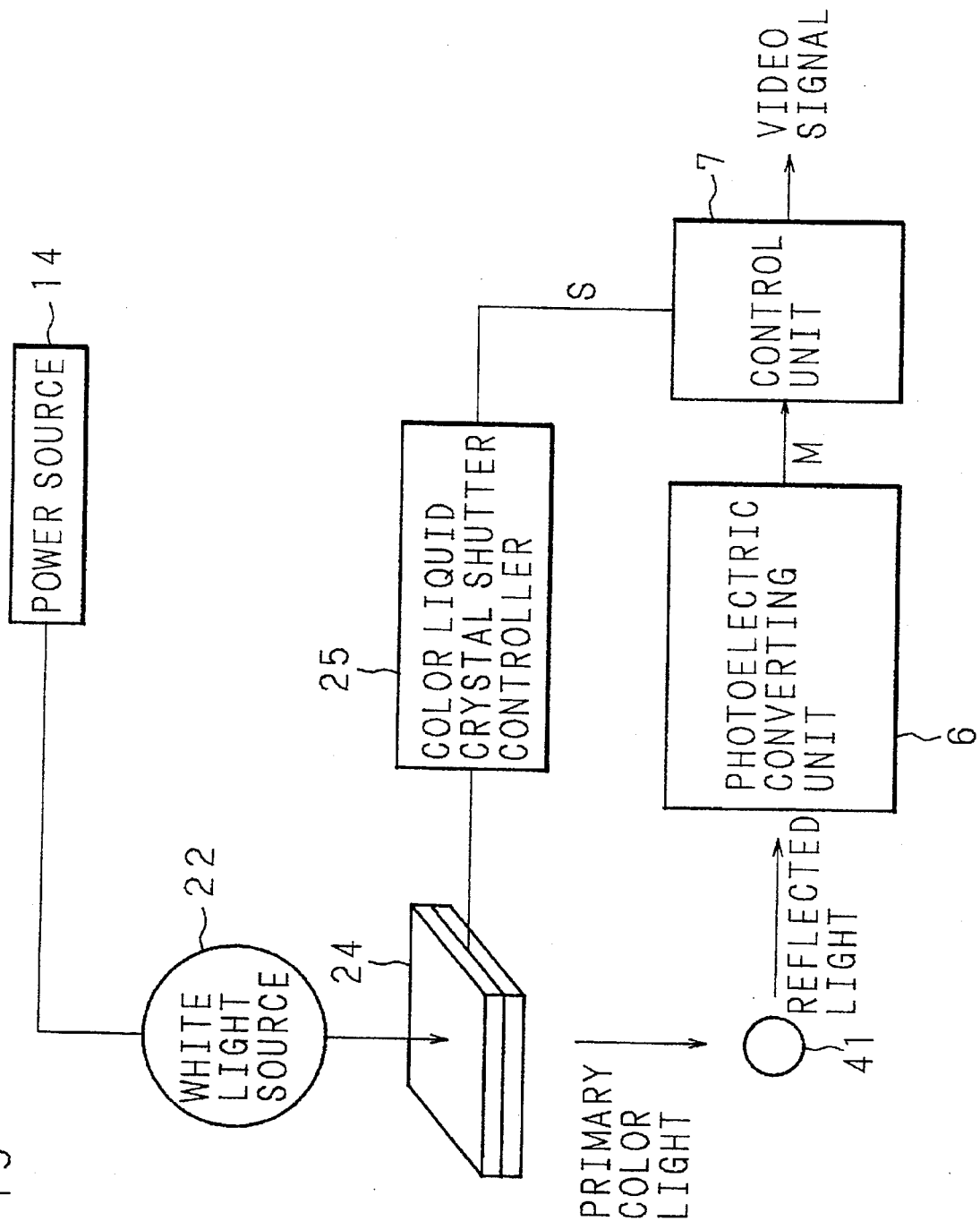
FIG. 15 is a view showing a structure of an embodiment 7 of an image pick-up apparatus according to the invention.

FIG. 15 is a view showing a structure of an embodiment 7 of the image pick-up apparatus according to the invention. This embodiment uses a color liquid crystal shutter 24 instead of the rotary color filter 23 shown in FIG. 14. The color liquid crystal shutter 24 includes three regions of red (R), green (G) and blue (B) arranged in a matrix form, and its transparent regions are controlled by a color liquid crystal shutter controller 25 on the basis of the light emission control signal S. The light emitted from the white light source 22 is colored by the color liquid crystal shutter 24 before being radiated to the subject 41. The photoelectric converting unit 6 and the control unit 7 have the same structures as those shown in FIG. 6. This embodiment can provide the same effects as the embodiment 6.

Embodiment 8

Figure 16:
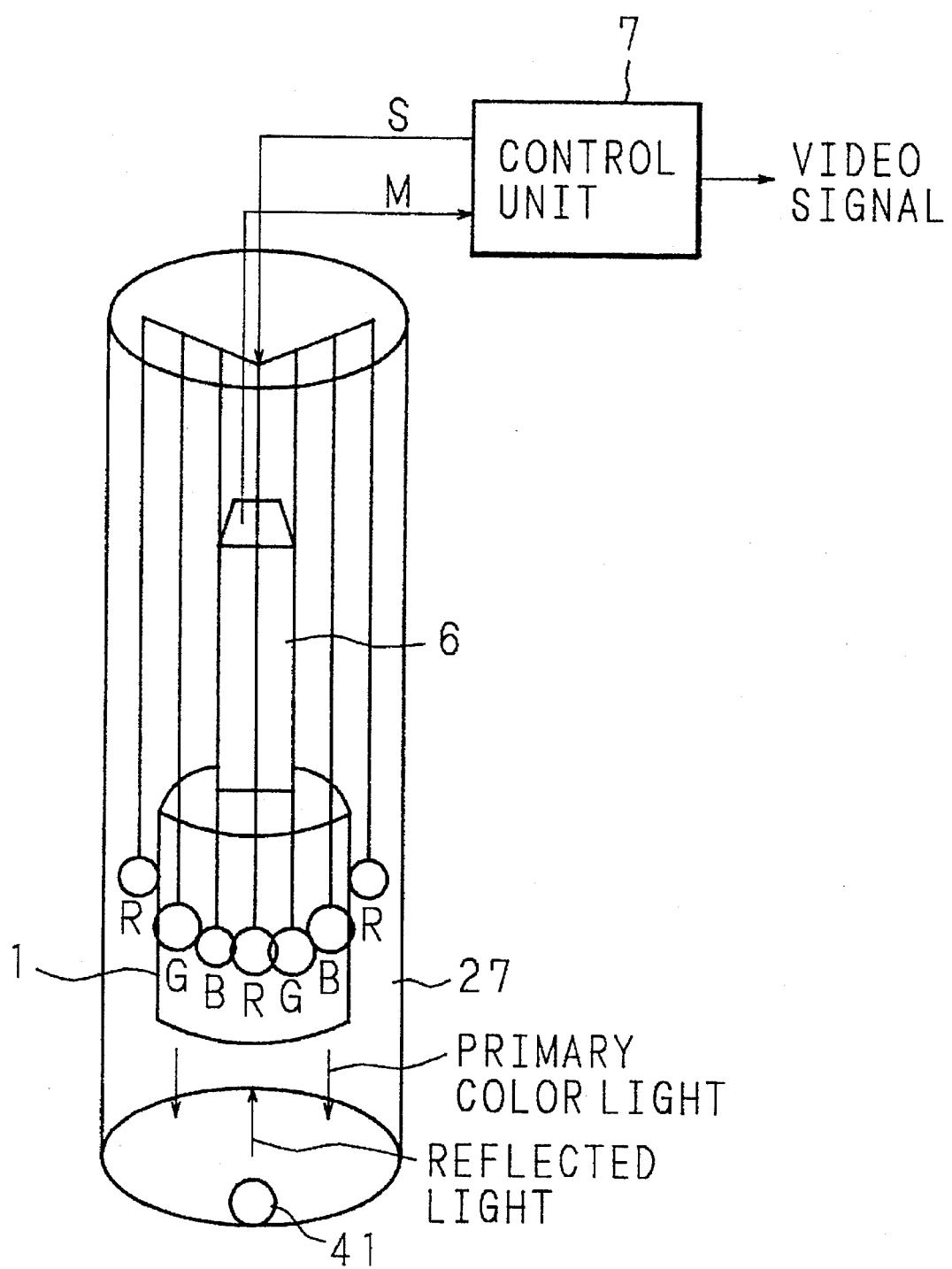
FIG. 16 is a view showing a structure of an embodiment 8 of an image pick-up apparatus according to the invention.

FIG. 16 is a view showing a structure of an embodiment 8 of the image pick-up apparatus according to the invention. This embodiment is suitable for close-up image pick-up. In the figure, numeral 27 denotes a container accommodating the primary color light source 1 and the photoelectric converting unit 6. The photoelectric converting unit 6 includes a close-up lens and a compact image pick-up element, around which is disposed the compact primary color light source 1 having a large number of light emission sources. The control unit 7 has the same structure as that shown in FIG. 6.

Although the close-up image pick-up generally requires a light source for illumination because of low luminosity of the subject, this embodiment does not require the illumination. Since many light emission sources are uniformly arranged at the positions of the same distance from the subject 41, uniform white balance can be obtained. The compact image pick-up element may be a compact CCD, and the compact primary color light source may be composed of an LED, whereby the compact image pick-up apparatus can be obtained. Similar to the embodiment 1, a video signal of high resolution can be obtained.

Embodiment 9

Figure 17:
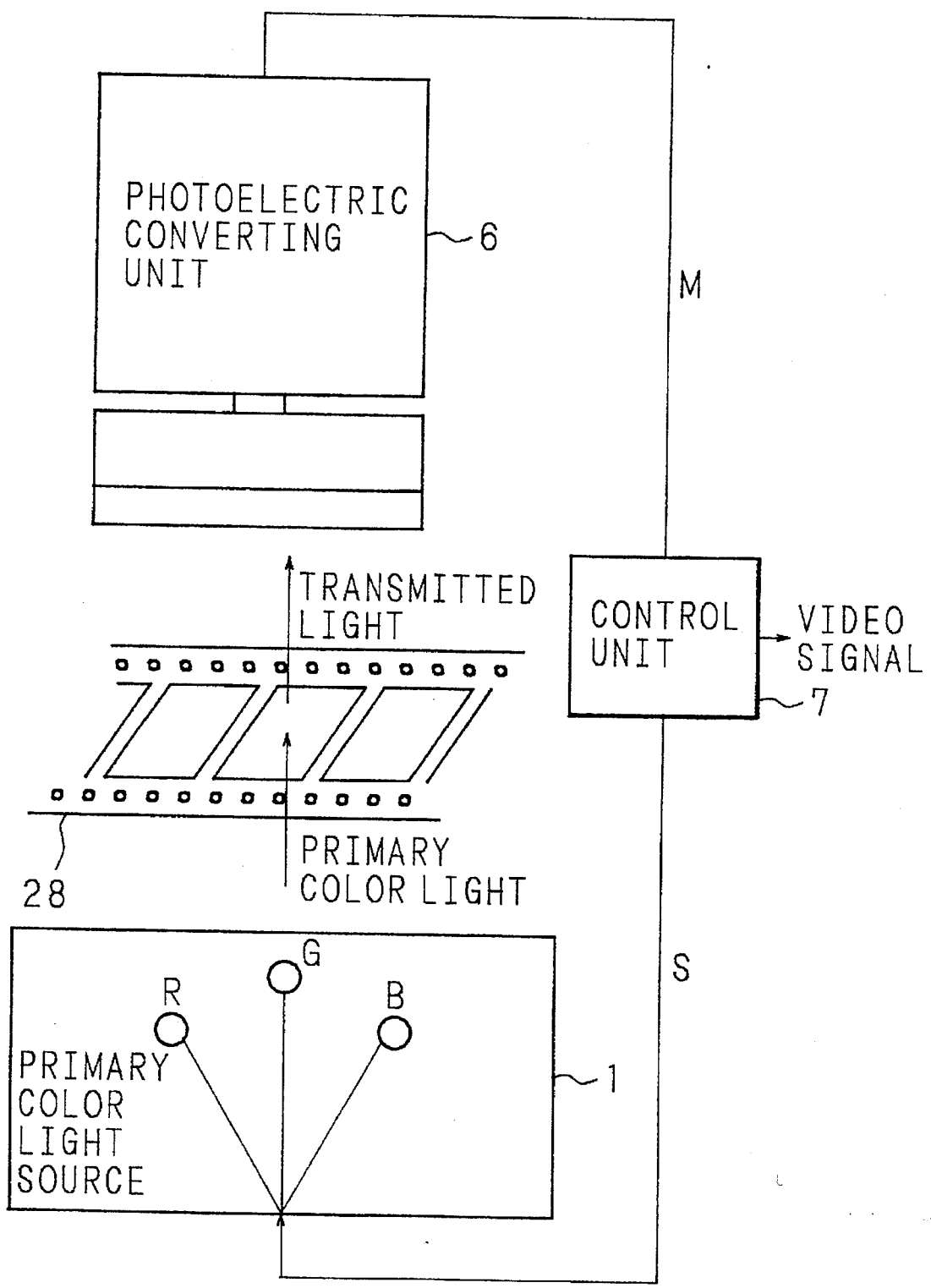
FIG. 17 is a view showing a structure of an embodiment 9 of an image pick-up apparatus according to the invention.

FIG. 17 is a view showing a structure of an embodiment 9 of the image pick-up apparatus according to the invention.

In this embodiment, the primary color light emitted from the primary color light source 1 passes through a color film 28 and then is supplied into the photoelectric converting unit 6. The control unit 7 has the same structure as that shown in FIG. 6.

This embodiment uses a mono-color CCD as the image pick-up element, and can provide a color picture of which resolution is three times as high as that in case of using of a color CCD including pixels of the same number. Since this embodiment allows direct connection to the color display of the color-field sequential type, the whole structure including the display can have reduced size without reducing the resolution.

This embodiment can be applied to transparent subjects such as a color slide in addition to the color film.

According to the image pick-up apparatus of the invention, as described hereinbefore, there is provided light emitting means for sequentially emitting a plurality of color lights to the subject, and the image is taken from the reflected light by one mono-color image pick-up element. Therefore, the mono-color image pick-up element sequentially supplies the video signals of the respective colors corresponding to the plurality of color lights. The color-field sequential signals are converted by the converting means into various kinds of video signals such as the color-field sequential primary chrominance signals of triple speed. Thereby, the size and cost can be reduced, and the resolution can be increased.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such mates and bounds thereof are therefore intended to be embraced by the claims.

What is claimed is:

1. An image pick-up apparatus comprising:
   light emitting means for emitting a plurality of colors of light to radiate a subject;
   a mono-color image pick-up element photo-electrically converting reflected light or transmitted light corresponding to respective colors of light emitted from said light emitting means and reflected by or transmitted through the subject, into color-field sequential signals;
   memory means for storing the color-field sequential signals separately in connection with respective colors; and
   converting means for converting the color-field sequential signals from said memory means into video signals selected from the group which includes the color-field sequential signals, primary chrominance signals, luminance signals, color-difference signals, carrier chrominance signals and composite video signals.

2. The image pick-up apparatus according to claim 1, wherein
   said light emitting means emits the plurality of colors of light sequentially in a predetermined period, and
   wherein the image pick-up apparatus further comprises control means for controlling a memory period of said memory means and a light emission period of said light emitting means by making the memory period and the light emission period correspond to each other.

3. The image pick-up apparatus according to claim 2, further comprising:
   synchronization pulse generating means for periodically generating synchronizing pulses;
   said control means for controlling said memory means to store a color-field sequential signal during an interval demarcated by two of the synchronizing pulses and for controlling said light emitting means to emit a color of light during an interval demarcated by one of the synchronizing pulses to synchronize the memory means and light emitting means.

4. The image pick-up apparatus according to claim 1, wherein said light emitting means is so operated as to continuously emit the plurality of colors of light, and
   wherein the image pick-up apparatus further comprises shield means disposed between said light emitting means and the subject, said shield means intermittently blocks the plurality of colors of light emitted by said light emitting means.

5. The image pick-up apparatus according to claim 4, wherein
   said shield means includes a rotary shield plate provided with a slit and rotation control means for controlling rotation of said rotary shield plate in synchronization with the plurality of colors of light emitted by said light emitting means.

6. The image pick-up apparatus according to claim 1, wherein
   said plurality of colors of light are three primary colors of red, green and blue.

7. The image pick-up apparatus according to claim 2, wherein
   said plurality of colors of light are three primary colors of red, green and blue.

8. The image pick-up apparatus according to claim 4, wherein
   said plurality of colors of light are three primary colors of red, green and blue.

9. The image pick-up apparatus of claim 1, further comprising:
   control means for controlling said light emitting means to sequentially emit each of the plurality of colors of light during distinct time periods wherein said control means controls the relative duration of each of the distinct time periods to control a ratio of light colors emitted by said light emitting means.

10. The image pick-up apparatus of claim 1, further comprising:
    control means for controlling said memory means to stroboscopically capture an image of the subject.

11. A method for generating an image of a subject comprising the steps of:
    emitting a plurality of colors of light to radiate the subject;
    photoelectrically converting light reflected from or transmitted through the subject, corresponding to respective colors of light being emitted and reflected by or transmitted through the subject, into color-field sequential signals;
    storing the color-field sequential signals separately in connection with respective colors; and
    converting the color-field sequential signals stored in said storing step into video signals selected from the group which includes the color-field sequential signals, primary chrominance signals, luminance signals, color-difference signals, carrier chrominance signals and composite video signals.

12. An apparatus for capturing an image of a subject, comprising:
    color light means for sequentially emitting a plurality of colors of light;

rotary shield means, disposed between said color light means and the subject, said rotary shield means periodically interrupts the plurality of colors of light emitted by said color light means;

a photo-electric converting unit, receiving the plurality of colors of light periodically interrupted by said rotary shield means and reflected by the subject and converting the received light into color-field sequential signals; and memory means for storing the color-field sequential signals separately for each of the plurality of colors of light sequentially emitted by said color light means.

13. The apparatus of claim 12, wherein said rotary shield means includes:

an opaque shield disc provided with a transparent slit;

a motor imparting rotational motion to said shield disc; and a motor controller controlling the rotational motion imparted to said shield disc by said motor.

14. The apparatus of claim 13, wherein said motor controller controls said motor such that the rotation of said shield disc permits light to pass through the slit in the shield disc during distinct time periods wherein said motor controller controls the relative duration of each of the distinct time periods to control a ratio of light colors passing through the slit in the shield disc.

15. The apparatus of claim 12, further comprising:

control means for controlling said memory means to stroboscopically capture an image of the subject.

16. The apparatus of claim 12, further comprising:

converting means for converting the color-field sequential signals stored in said memory means into video signals selected from the group which includes the color-field sequential signals, primary chrominance signals, luminance signals, color-difference signals, carrier chrominance signals and composite video signals.

17. The apparatus of claim 12, wherein the plurality of colors of light are red, green and blue.

18. A method for capturing an image of a subject, comprising the steps of:

sequentially emitting a plurality of colors of light;

periodically interrupting the plurality of colors of light emitted by said emitting step with a rotary shield;

receiving the plurality of colors of light periodically interrupted by the rotary shield and reflected by the subject and converting the received light into color-field sequential signals; and storing the color-field sequential signals separately for each of the plurality of colors of light sequentially emitted by said emitting step.

* * * * *